United States Patent [19]

Blazejovsky

[11] Patent Number: 4,600,825

[45] Date of Patent: Jul. 15, 1986

[54] ELECTRICALLY HEATED DIESEL ENGINE FUEL CONVEYING SYSTEM

[76] Inventor: Walter Blazejovsky, No. 1-39/31/3 Schüttaustrasse, A-1220 Vienna, Austria

[21] Appl. No.: 498,664

[22] Filed: May 27, 1983

Related U.S. Application Data

[63] Continuation-in-part of Ser. No. 270,155, Jun. 3, 1981, abandoned.

[51] Int. Cl.[4] .................. F02M 31/00; B01D 35/18; F24H 1/10; H05B 3/00
[52] U.S. Cl. .................. 219/205; 123/549; 123/557; 210/185; 219/205; 219/296; 219/522; 431/208
[58] Field of Search .............. 219/200, 201, 205–208, 219/522, 296; 210/184, 185, 186; 123/549, 557; 431/208; 137/341

[56] References Cited

U.S. PATENT DOCUMENTS

| | | | |
|---|---|---|---|
| 2,103,434 | 12/1937 | Pennebaker | 210/185 |
| 2,251,630 | 8/1941 | Loeffler et al. | 219/206 |
| 2,306,984 | 12/1942 | Tolman | 210/165 |
| 2,635,174 | 4/1953 | Kasten | 219/201 |
| 2,654,826 | 10/1953 | Spurlin | 219/205 X |
| 3,235,084 | 2/1966 | King et al. | 210/149 |
| 4,091,265 | 5/1978 | Richards et al. | 219/501 |
| 4,228,776 | 10/1980 | Gallione et al. | 123/549 |
| 4,321,136 | 3/1982 | Matsui | 210/186 |

FOREIGN PATENT DOCUMENTS

| | | | |
|---|---|---|---|
| 552750 | 6/1974 | Switzerland . | |
| 445724 | 4/1936 | United Kingdom | 431/208 |
| 1044001 | 9/1966 | United Kingdom | 219/296 |

Primary Examiner—A. Bartis
Attorney, Agent, or Firm—Seidel, Gonda, Goldhammer & Abbott

[57] ABSTRACT

The invention relates to a system for conveying fuel, preferably diesel fuel, to an engine, in particular a diesel engine. The invention includes a pipe, at least one filter and a fuel pump. At least one heating element is provided on a portion of the area of the surface of the filter and in the path of the diesel fuel for partially melting paraffin deposits of the fuel on the heated portion of the filter surface. The heating element extends over only a portion of the surface of the filter, for example over 0.02 to 20 percent of said surface relative to a diesel engine power of 36 kW to 4500 kW. The heating element may be controlled in response to fuel flow through the filter, the pressure difference between the downstream and upstream sides of the filter, absolute pressure on the downstream side of the filter, or in response to the temperature difference between the temperature of the fuel at points upstream and downstream of the filter. The heating element wattage of the filter is 1 watt to 1000 W relative to a diesel engine power of 36 kW to 4500 kW.

12 Claims, 9 Drawing Figures

ELECTRICALLY HEATED DIESEL ENGINE FUEL CONVEYING SYSTEM

This application is a continuation-in-part of application Ser. No. 270,155, filed June 3, 1981, now abandoned.

The invention relates to a fuel conveying system, preferably for diesel fuel.

It is generally known that at low environmental temperatures, paraffin deposits clogging up the filter surfaces and other narrow passages in the conveying path form in certain fuels, in particular in diesel fuel.

The low temperature behavior of fuels is adapted by the mineral oil companies to the limatic conditions under which the fuels are to be used by the selection of appropriate components. Austrian Standard C 1104 defines the low temperature behavior of a diesel fuel exclusively according to the cold filter plugging point (CFPP) and establishes this value with a maximum $+5°$ C. for the summer (April 1 through September 30) and a maximum $-15°$ C. for the winter (October 1 through March 31). The cold filter plugging point is determined in a standard apparatus by measuring that temperature at which a predetermined amount of the fuel cooling in a refrigerating brine can no longer be drawn through a screen of standard mesh size at predetermined sub pressure within a predetermined period of time. This value is intended to indicate possible failures due to paraffin deposits in pipeline systems and filter screens.

For reasons of economy, the standardization of the low temperature behavior can of course not be adapted to occurring minimum temperatures, so that in certain cases, difficulties arise even if the standard values are observed, as practice has proven time and again.

A known system of the type initially mentioned is provided with a filter having a heatable filter surface. The heating element in the form of an electric resistance wire extends over the entire filter surface so that the entire filter surface is heated. The energy requirements of this filter are so high that they cannot be met in a diesel powered vehicle, for example, without relying on an external energy source. Moreover, the battery efficiency of a vehicle drops so low at low temperatures that there is hardly enough energy left to heat up the entire fuel stream flowing through the filter. (U.S. Pat. No. 2,635,174).

It is the object of the invention to reduce the energy requirements for heating the fuel at simultaneous maintenance of the conveyance of the fuel.

The invention is directed to a system for conveying diesel fuel to a diesel engine and comprises a pipe means, a first filter, a second filter and a fuel pump. Each of the filters has at least one electric heating element located on a portion of the area of the surface of the filter and in the path of the diesel fuel. The heating elements may be supplied by a battery. The heating element wattage is preferably between one watt and 100 watts, relative to a diesel engine power of 36 kW to 4500 kW. The portion of the area of the filter on which the heating element is located is only 0.02% to 20% of the filter surface for partially melting paraffin deposits of the fuel in the filter.

This measure allows a partial heating of the filter surface or another critical spot in the conveying path of the fuel quickly and at low energy expenditure at and following the cold start of the machine at low outside temperatures, so as to eliminate a possible obstacle in the conveying path of the fuel caused by paraffin deposits.

The result is a melting of the paraffin on a limited filter surface which merely requires raising the temperature of a limited filter surface above the melting point of the paraffin deposited, but no heating beyond that, let alone heating up the entire fuel stream flowing through. This arrangement permits an essentially reduced energy requirement so that the amount of energy needed may be drawn from a vehicle battery even at low temperatures without impairing the starting efficiency.

The required time of operation of the heating element for rapid heating is assured by the fact that the heating element of the filter can be controlled or regulated, preferably by means of at least one time relay, as a function of time. It would of course also be possible to switch the heating element off and on manually.

The invention is described in detail with reference to the drawings, showing a preferred embodiment of the invention with variants.

Figure 1:
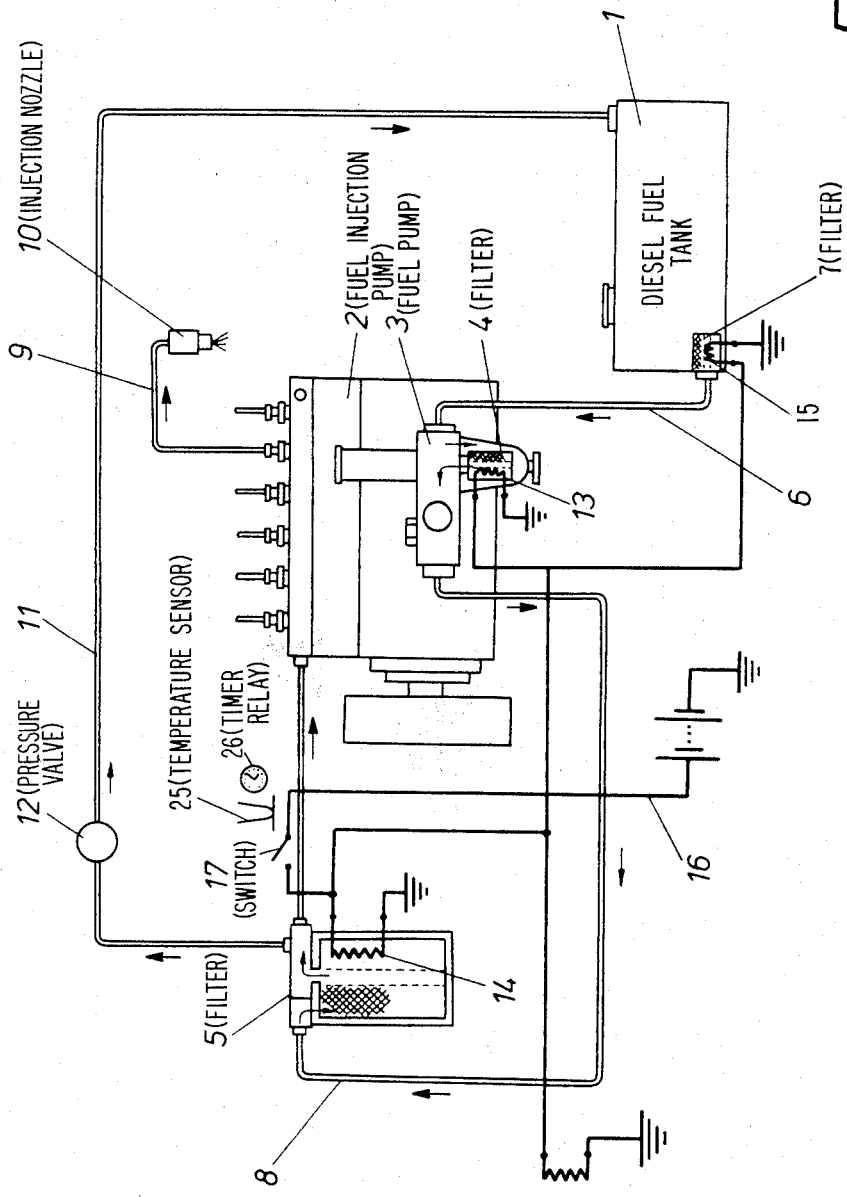
FIG. 1 shows a diagram of a system according to the invention.
Figure 4:
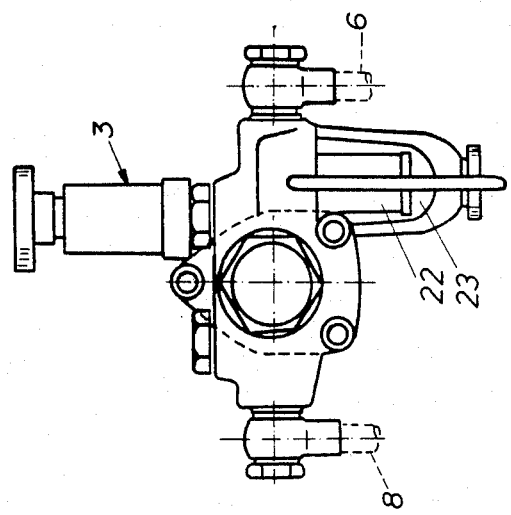
FIG. 4 shows a fuel pump with water pocket and filter.

The system for conveying diesel fuel from a fuel tank 1 to the injection pump 2 of a diesel motor not described in detail essentially comprises a fuel pump 3 connected to the injection pump 2 of the diesel motor and driven by this pump and provided with a preliminary filter 4 and main filter 5 in the conveying path of the fuel between the fuel pump 3 and the injection pump 2.

The fuel pump 3 draws the fuel in via a suction line 6 and a coarse filter 7 in the fuel tank 1, and forces the fuel through a pressure line 8 to the main filter 5 and further to the injection pump 2. From the injection pump 2, the fuel is conveyed in a manner known per se via injection lines 9 to the injection nozzles 10 of which one each is shown. From the main filter 5, a bypass line 11 leads back to the container 1. A pressure valve 12 is provided in the bypass line 11, and is adjusted to the prepressure required for the injection pump. In order to economize in the heating efficiency of the filters, the valve 12 or another valve in the bypass line 11 can be closed during the starting and warmup operation.

A heating element 13, 14, 15 is provided in the preliminary filter 4, the main filter 5 and the coarse filter 7, respectively. The heating elements are electrically heatable and are arranged in an electric circuit 16 and can be switched on by means of a switch 17 which is actuated by a temperature sensor 25 provided in the pressure line 8 between main filter 5 and injection pump 2. The heating elements are controlled as a function of time by means of at least one time relay 26.

Figure 2:
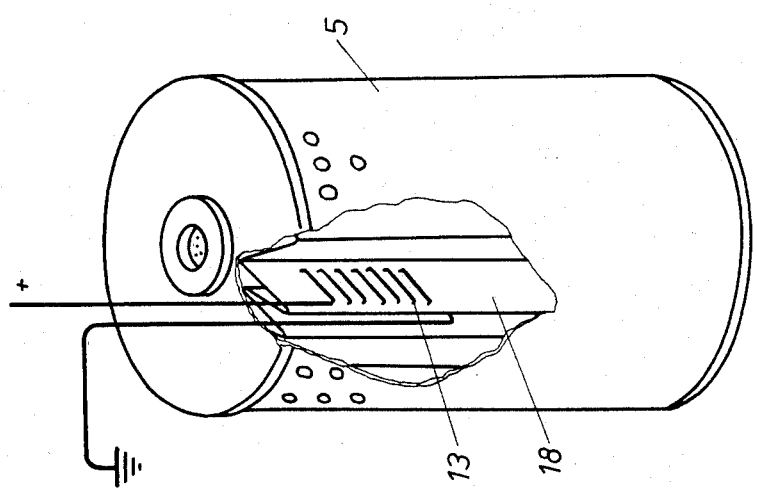
FIG. 2 shows the main filter from the installation of FIG. 1 in enlarged, perspective view.

As shown in detail in FIG. 2, the heating element 13 of the main filter 5 has the form of an electric resistance wire embedded or woven into the filter surfaces of the star-shaped filter insert 18. The heating element 13 extends over only a portion of the filter surface.

Figure 3:
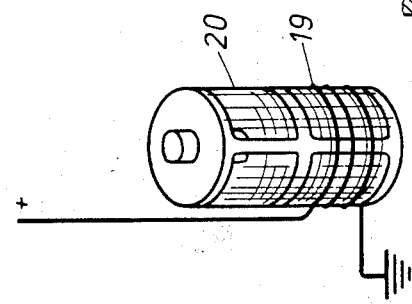
FIG. 3 shows a filter of the fuel pump.

FIG. 3 shows as a variant to this an embodiment in which a heating element 19 is wound in the form of an electric resistance wire on a cylindrical filter insert 20. This element also extends over only a portion of the filter surface.

Figure 5:
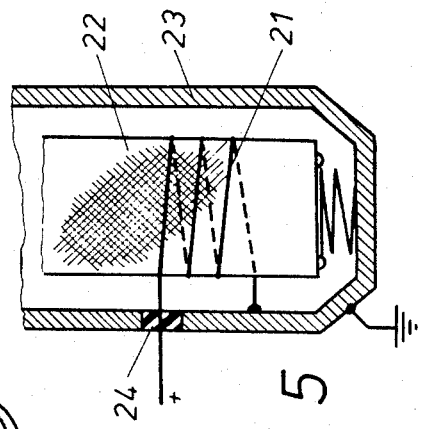
FIG. 5 shows a detail taken from FIG. 4 in enlarged scale.

FIG. 5 shows a similar embodiment with a heating element in the form of an electric resistance wire around a cylindrical filter insert 22. The free end of the heating element 21 is grounded on the interior of the metallic filter casing 23, the otherwise blank, i.e. non-insulated, wire is electrically insulated against the metallic filter casing 23 by means of an insulating sleeve 24 on its passage through the casing. It would of course also be possible to use insulated resistance wires.

Depending upon the operating conditions, in particular the outside temperatures, at which the motor is to be started, the heating elements assure a partial, rapid melting of the paraffin deposit with a minimum of energy expended.

The system according to the invention thus makes it possible to employ electricity for selectively melting certain zones in critical surfaces of the filter, in particular the filter screen of the fuel pump.

Since this is not a question of heating a large volume of fuel, but merely of melting paraffin in small, limited zones, the energy requirement is extremely low and can be covered by a vehicle battery without any problem.

The heating element wattage is released to the diesel engine power as follows:

| diesel engine power | heating element wattage |
| --- | --- |
| 36 kW | 1 to 200 W, preferably 10 W |
| 135 kW | 3 to 300 W, preferably 30 W |
| 250 kW | 10 to 500 W, preferably 100 W |
| 1450 to 4500 kW | 30 to 1000 W, preferably 300 W |

The size of the heated area of the filter surface is related to the diesel engine power as follows:

| diesel engine power | size of the heated area of filter surface (sq. cm) |
| --- | --- |
| 36 kW | 0.5 to 350, preferably 1.0 |
| 135 kW | 2.0 to 750, preferably 5.0 |
| 250 kW | 3.0 to 2000, preferably 10.0 |
| 1450 to 4500 kW | 50.0 to 3000, preferably 200.0 |

The heated area of the filter is preferably between 0.02% and 20% of the surface area of the filter.

The heating elements can be controlled in at least four ways:
- by means of a flowmeter metering the flow of the fuel through the filter;
- by means of the pressure difference in the path of the fuel upstream and downstream of the main filter;
- by means of metering the absolute pressure in the path of the fuel downstream of the main filter; and
- by means of the temperature difference between two points in the path of the fuel, one upstream and the other downstream of the filter.

Figure 6:
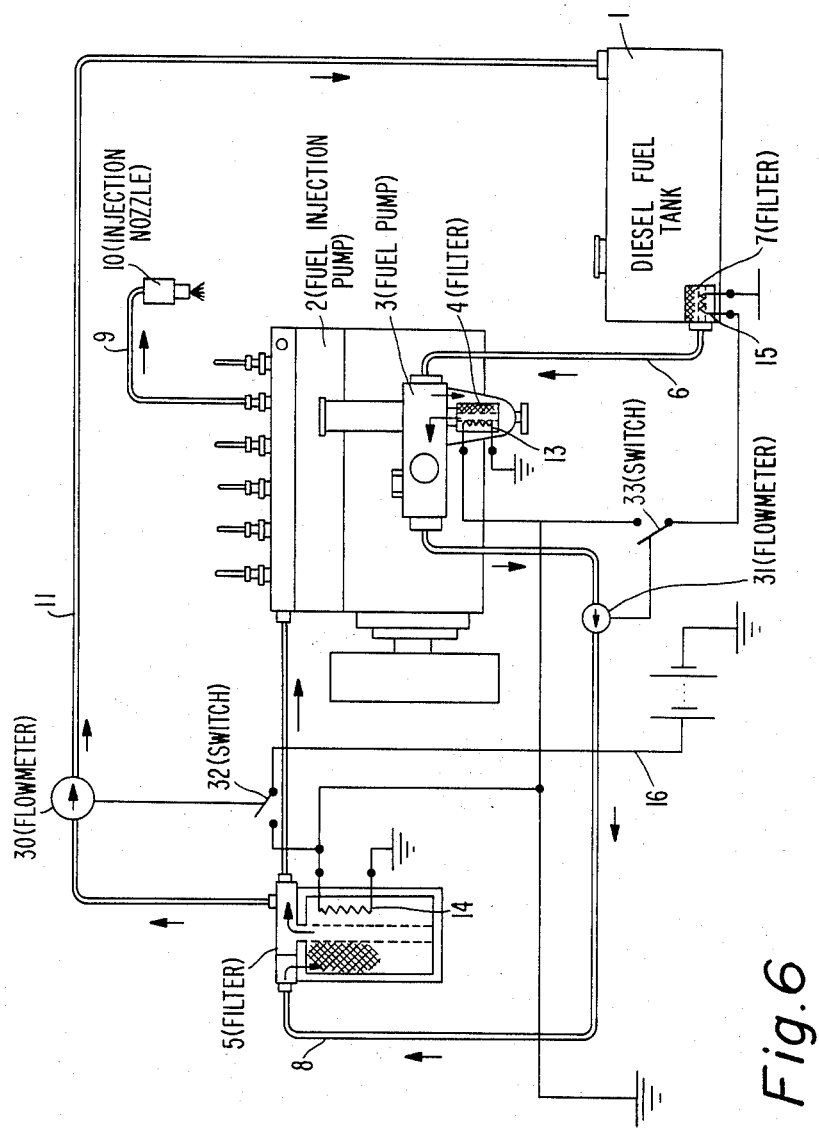
FIG. 6 shows an alternate embodiment of the system shown in FIG. 1 in which a flow meter controls the heating elements.

FIG. 6 shows the system according to FIG. 1 in which a flowmeter 30 is arranged in line 11 downstream of the main filter 5. A second flowmeter 31 is arranged in line 8 downstream of the preliminary filter 4 and fuel pump 3. The flowmeter 30 controls a switch 32 in order to control the heating element 14 in the main filter 5 and the flowmeter 31 controls a switch 33 in order to control the heating element 13 in the preliminary filter 4.

Figure 7:
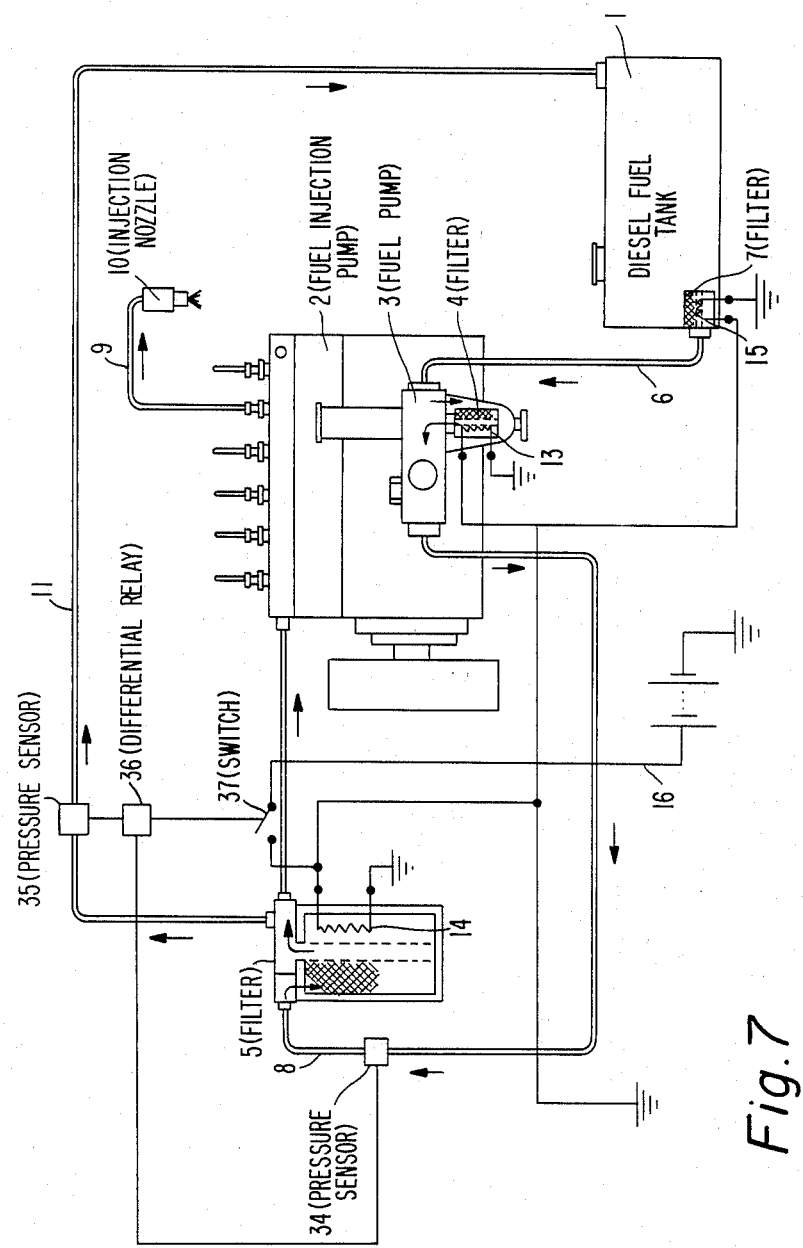
FIGS. 7 and 8 show an alternate embodiment of the system shown in FIG. 1, in which pressure sensors control the heating elements.

FIG. 7 shows the system according to FIG. 1 in which both the heating element 14 in main filter 5 and heating element 13 of preliminary filter 4 are controlled by means of the pressure difference between two points in the path of the fuel downstream and upstream of the main filter 5. In order to determine the pressure difference, a first pressure sensor 34 is arranged in line 8 upstream of the main filter 5 and a second pressure sensor 35 is arranged in line 11 downstream of the main filter 5. The pressure sensors 34, 35 are connected to a differential relay 36 or similar device which controls a switch 37 in the electric circuit of the heating element 14 in main filter 5 and in circuit with heating element 13 in preliminary filter 4 in response to the pressure difference between the sensors 34, 35. If the pressure difference between the sensors 34, 35 is too small, indicating a blockage due to paraffin deposits, the differential relay 36 will close switch 37 in order to supply electric energy to the heating elements 13 and 14, thereby melting the paraffin deposits in a predetermined area of the surface of the filter 5.

Figure 8:
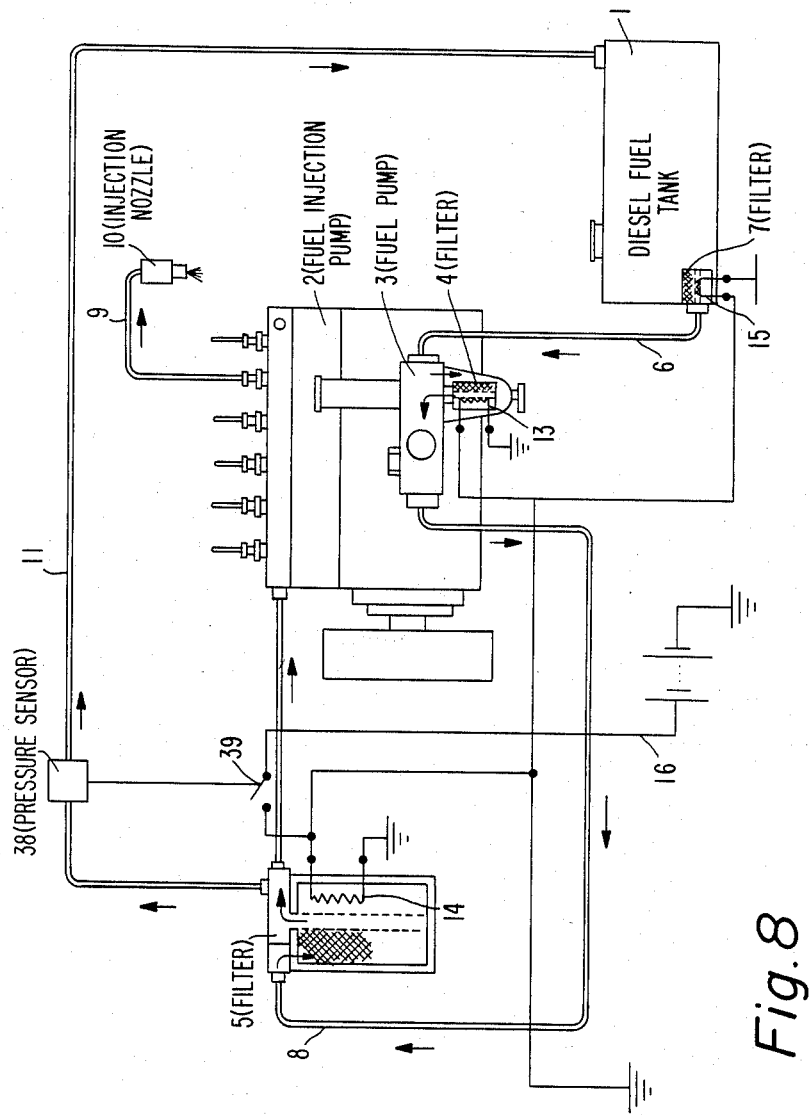

FIG. 8 shows the system according to FIG. 1 in which the heating element 14 of the main filter 5 and the heating element 13 of the preliminary filter 4 are controlled by means of the absolute pressure downstream of the main filter 5. For this purpose, a pressure sensor 38 is arranged in line 11 downstream of the filter 5. The pressure sensor 38 controls a switch 39 in the electric circuit of the heating elements 13 and 14. By actuating switch 39 in response to pressure sensor 38, the heating elements 13 and 14 can be controlled in response to the pressure in line 11.

Figure 9:
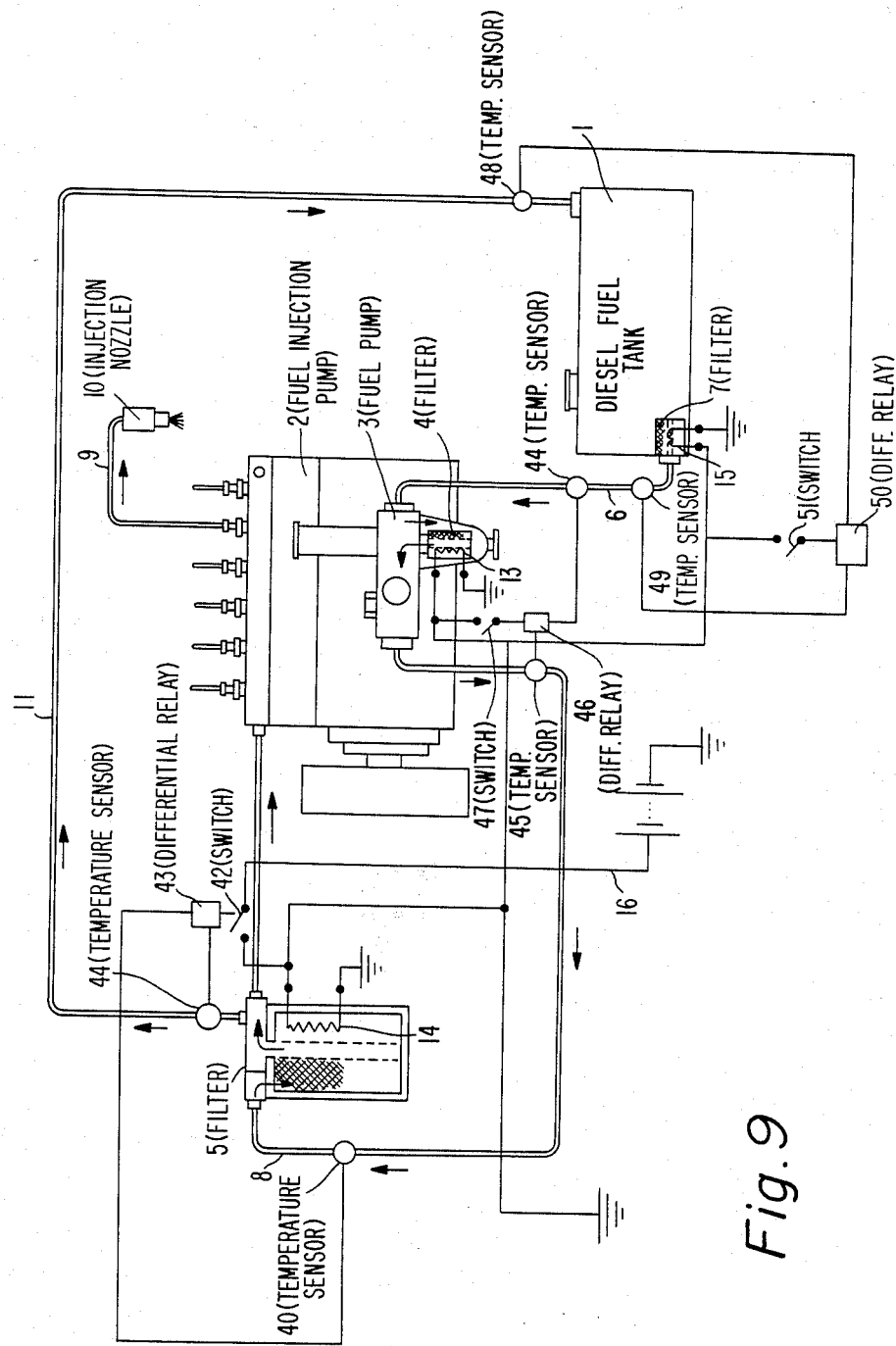
FIG. 9 shows an alternate embodiment of the system shown in FIG. 1, in which temperature sensors control the heating elements.

FIG. 9 shows the system according to FIG. 1 in which the heating element 14 of the main filter 5 is controlled by means of the temperature difference between two points in the path of the fuel. For this purpose, a temperature sensor 40 is arranged in line 8 upstream of the main filter 5 an a second temperature sensor 41 is arranged downstream of the main filter 5 in line 11. The temperature sensors 40, 41 actuate a differential relay 43, which controls switch 42 in the electric circuit of the heating element 14, in order to activate heating element 14 depending on the temperature difference in the path of the fuel. Similarly, heater 13 is controlled by temperature sensors 44, 45 located upstream and downstream of preliminary filter 4, and heater 15 is controlled by temperature sensors 48, 49 located upstream and downstream of coarse filter 7. Differential relays 46, 50 are identical to relay 43 and control switches 47, 51, respectively, depending on the temperature difference in the path of the fuel.

The invention is mainly intended for devices for conveying diesel fuel, but it may also be applied to devices for conveying other types of fuels inclined to the formation of paraffin deposits, such as certain types of fuel oil for heating purposes.

I claim:
1. A system for conveying diesel fuel to a diesel engine comprising a pipe means, a first filter, a second filter downstream of and in series with the first filter and a fuel pump, each of said filters having an electrically heatable heating element located on a portion of the area of the surface of the filter and in the path of the diesel fuel, said heating element of each filter being supplied by a battery, the heating element wattage of the heating element of each filter being 1 watt to 1000 watts relative to a diesel engine power of 36 kW to 4500 kW, said portion of the areas of each filter heated by the heating element associated therewith being only 0.02 percent to 20 percent of the filter surface area of the filter relative to a diesel engine power of 36 kW to 4500 kW for melting paraffin deposits of the fuel on the heated portion of the filter surface.

2. A system according to claim 1, wherein each said heating element is separately controlled by means of a flowmeter responsive to the flow of the fuel through the filter on which said heating element is located.

3. A system according to claim 1, wherein each said heating element is controlled by means of a pressure sensor responsive to the absolute pressure in the path of the fuel downstream of said second filter.

4. A system according to claim 3, wherein said pressure sensor is located in the path of the fuel downstream of said second filter and is operatively associated with a switch connected in series with said battery and each of said heating elements.

5. A system according to claim 1, wherein each said heating element is separately controlled by means of temperature sensors responsive to the temperature difference between two points in the path of the fuel, one point being upstream of the filter associated with each said heating element and the other point being downstream of said filter.

6. A system according to claim 5, further comprising a first temperature sensor located in the path of the fuel upstream of each said filter to sense the temperature at said one point, a second temperature sensor located in the path of the fuel downstream of each said filter to sense the temperature at said other point, each temperature sensor providing a signal representative of sensed temperature, comparison means for comparing the signals representative of sensed temperature and generating a difference signal representative of the difference between the sensed temperatures, and switch means connected in series with said battery and each said heating element, said switch means being responsive to said difference signal.

7. A system for conveying diesel fuel to a diesel engine having a power of 36 kW to 135 kW, said device comprising a pipe means, a first filter, a second filter and a fuel pump, the second filter being downstream of and in series with the first filter and the fuel pump, each of said filters having an electrically heatable heating element located on a portion of the area of the surface of the filter and in the path of the diesel fuel, wherein said heating elements are supplied by a battery, the heating element wattage of the heating element of each filter being 10 watts to 30 watts relative to a diesel engine power of 36 kW to 135 kW and said portions of the area of each filter heated by the heating element associated therewith being only 1 to 5 square centimeters relative to a diesel engine power of 36 kW to 135 kW for partially melting paraffin deposits of the fuel on the heated portion of the filter surface.

8. A system according to claim 7, wherein the diesel engine has a power of 36 kW, said portion of said area is 1 square centimeter and the heating element wattage is 10 watts.

9. A system according to claim 7, wherein the diesel engine has a power of 135 kW, said portion of said area is 5 square centimeters and the heating element wattage is 30 watts.

10. A system for conveying diesel fuel to a diesel engine having a power of 250 kW to 4500 kW, said device comprising a pipe means, a first filter, a second filter and a fuel pump, the second filter being downstream of and in series with the first filter and the fuel pump, each of said filters having an electrically heatable heating element located on a portion of the area of the surface of the filter and in the path of the diesel fuel, said heating element of each filter being supplied by a battery, the heating element wattage of each heating element being 100 watts to 300 watts relative to a diesel engine power of 250 kW to 4500 kW, and the portion of the area of each filter heated by the heating element associated therewith being only 10 to 200 square centimeters relative to a diesel engine power of 250 kW to 4500 kW for partially melting paraffin deposits of the fuel on the heated portion of the filter surface.

11. A system according to claim 10, wherein the diesel engine has a power of 250 kW, said portion of said area is 10 square centimeters and the wattage of the heating element is 100 watts.

12. A system according to claim 10, wherein the diesel engine has a power of 1400 to 4500 kW, said portion of said area is 20 square centimeters and the wattage of the heating element is 300 watts.

* * * * *